United States Patent
Youn et al.

(10) Patent No.: US 8,556,261 B2
(45) Date of Patent: Oct. 15, 2013

(54) POWER TRANSMISSION METHOD AND APPARATUS, MEDIUM DISCHARGING APPARATUS USING THE SAME, AND IMAGE FORMING DEVICE HAVING THE MEDIUM DISCHARGING APPARATUS

(71) Applicants: Karp-sik Youn, Hwaseong-si (KR); Jin-ho Park, Yongin-si (KR)

(72) Inventors: Karp-sik Youn, Hwaseong-si (KR); Jin-ho Park, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/724,144

(22) Filed: Dec. 21, 2012

(65) Prior Publication Data

US 2013/0114983 A1  May 9, 2013

Related U.S. Application Data

(62) Division of application No. 11/708,019, filed on Feb. 20, 2007, now Pat. No. 8,356,707.

(30) Foreign Application Priority Data

Sep. 16, 2006 (KR) .............................. 2006-0089871

(51) Int. Cl.
*B65H 29/14* (2006.01)
*B65G 13/071* (2006.01)

(52) U.S. Cl.
USPC ............ 271/278; 198/789; 399/405; 399/322

(58) Field of Classification Search
None
See application file for complete search history.

(56) References Cited

U.S. PATENT DOCUMENTS

| | | | | |
|---|---|---|---|---|
| 2,635,733 A | * | 4/1953 | Reichl | 414/432 |
| 4,724,950 A | * | 2/1988 | Okamura | 198/780 |
| 5,115,759 A | * | 5/1992 | Kagayama | 118/621 |
| 5,176,374 A | * | 1/1993 | Yamada | 271/9.11 |
| 5,261,526 A | | 11/1993 | Rombouts | |
| 5,384,586 A | | 1/1995 | Hirano et al. | |
| 5,400,711 A | * | 3/1995 | Kemp | 101/425 |
| 6,007,063 A | | 12/1999 | Park | |
| 6,135,591 A | | 10/2000 | Ikeda et al. | |
| 6,722,277 B2 | | 4/2004 | Stephan | |
| 2002/0085078 A1 | | 7/2002 | Tanno | |

FOREIGN PATENT DOCUMENTS

WO    2006-052389    5/2006

OTHER PUBLICATIONS

European Search Report dated Jan. 10, 2008 issued in EP 07110109.1.

* cited by examiner

*Primary Examiner* — Kavel Singh
(74) *Attorney, Agent, or Firm* — Stanzione & Kim, LLP

(57) ABSTRACT

A power transmission, which transmits a driving force from a driving roller to a driven roller by using a friction roller. The power transmission includes a driving roller, a driven roller spaced apart from the driving roller, and a friction roller to transmit a driving force from the driving roller to the driven roller. The friction roller is disposed above a line connecting between centers of the driving roller and the driven roller. With this construction, the friction roller transmits the driving force in a state of being interposed between the driving rollers and the driven rollers by rotation thereof, thereby allowing the power transmission to have a simplified structure, which does not require a separate pressing spring, and at the same time, to generate a minimum amount of power loss.

34 Claims, 5 Drawing Sheets

POWER TRANSMISSION METHOD AND APPARATUS, MEDIUM DISCHARGING APPARATUS USING THE SAME, AND IMAGE FORMING DEVICE HAVING THE MEDIUM DISCHARGING APPARATUS

CROSS-REFERENCE TO RELATED APPLICATIONS

This application is a divisional of prior application Ser. No. 11/708,019, filed on Feb. 20, 2007 in the U.S. Patent and Trademark Office which claims the benefit of Korean Patent Application No. 10-2006-0089871 filed Sep. 16, 2006, in the Korean Intellectual Property Office, the entire disclosure of which is hereby incorporated in its entirely by reference.

BACKGROUND OF THE INVENTION

1. Field of the Invention

The present general inventive concept relates to a power transmission. More particularly, the present general inventive concept relates to a power transmission using a friction roller, a medium discharging apparatus having the power transmission, and an image forming apparatus having the medium discharging apparatus.

2. Description of the Related Art

Generally, methods are known which transmit a driving force of a driving roller to a driven roller in an image forming apparatus, such as a printer, a copier, or the like, using a gear, a method using a belt, a method using a friction roller, etc. Among these methods, the method using the friction roller is popularly used, in that it generates relatively low noise, simplifies construction, and minimizes space utilization, as compared with other methods.

FIG. 1 is a view schematically exemplifying an example of an image forming device in which a power transmission using a general friction roller is employed. In FIG. 1, reference numerals 10, 20, 30, 40, and 50 represent an image forming unit, a medium supplying unit, a driving roller, a driven roller, and a friction roller, respectively.

The driving roller 30 is rotated by a driving source, which is not illustrated. A rotating force of the driving roller 30 is transmitted to the driven roller 40 by the friction roller 50, and thus the driven roller 40 is rotated along with the driving roller 30 to convey a printing medium P supplied from the medium supplying unit 20.

The friction roller 50 is elastically urged upward by a pressing spring 60, so that it comes in contact with the driving roller 30 and the driven roller 40. To increase a friction force, the rollers 30, 40, and 50 are formed of a rubber roller or a surface-treated metal shaft.

However, the power transmission using the general friction roller as described above is configured to press the friction roller 50 against the driving roller 30 and the driven roller 40 through the pressing spring 60. Accordingly, the power transmission may generate a power loss. To compensate for the power loss, the power transmission needs a large driving source, thereby resulting in an increase in costs.

SUMMARY OF THE INVENTION

The present general inventive concept provides a power transmission in which a friction roller transmits a driving force in a state of being interposed between driving rollers and driven rollers by rotation thereof, thereby allowing the power transmission to have a simplified structure which does not require a separate pressing spring.

The present general inventive concept also provides a medium discharging apparatus using the power transmission as described above and an image forming apparatus having the medium discharging apparatus.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a power transmission including a driving roller, a driven roller spaced apart from the driving roller, and a friction roller disposed above a line connecting between centers of the driving roller and the driven roller to transmit a driving force from the driving roller to the driven roller.

The friction roller may transmit the driving force in a state interposed between the driving roller and the driven roller by rotation thereof.

The friction roller may have a diameter of magnitude, which does not project over a tangent line connecting circumferential surfaces of the driving roller and the driven roller.

The friction roller may be formed of a metal shaft or a rubber roller. In a case that the friction roller is formed of the metal shaft, it may have an uneven part formed on an outer circumferential surface thereof.

The foregoing and/or other aspects and utilities of the present general inventive concept may also be achieved by providing a power transmission including a driving roller rotatable in forward and backward directions, a driven roller spaced apart from the driving roller, and a friction roller placed on the driving roller and the driven roller to rotate according to a rotation of the driving roller. In a forward rotation of the driving roller, the friction roller rotates in a state interposed between the driving roller and the driven roller to transmit a driving force, and in a backward rotation of the driving roller, floats up from the driving roller and the driven roller to block the driving force from being transmitted to the driven roller.

The friction roller may be disposed above a line connecting between centers of the driving roller and the driven roller.

The foregoing and/or other aspects and utilities of the present general inventive concept may also be achieved by providing a medium discharging apparatus of an image forming device including a medium discharging frame, a driving roller assembly rotatably disposed to the discharging frame, and having a driving axis, and a plurality of driving rollers disposed on the driving axis, a driven roller assembly rotatably disposed to the discharging frame to be spaced apart from the driving roller assembly, and having a driven axis, and a plurality of driven rollers disposed on the driven axis, and a friction roller disposed above a line connecting between centers of the driving roller assembly and the driven roller assembly to transmit a driving force from the driving roller assembly to the driven roller assembly.

The medium discharging frame may be an accommodating groove formed to accommodate the friction roller.

The apparatus may further include a plurality of star wheels to assist the driving roller and the driven roller to convey a printing medium.

The foregoing and/or other aspects and utilities of the present general inventive concept may also be achieved by providing a medium discharging apparatus of an image forming device including a medium discharging frame, a driving roller assembly disposed to the discharging frame to be rotatable in forward and backward directions, and having a driving axis, and a plurality of driving rollers disposed on the driving axis, a driven roller assembly rotatably disposed to the discharging frame to be spaced apart from the driving roller assembly, and having a driven axis, and a plurality of driven rollers disposed on the driven axis, and a friction roller placed on the driving roller assembly and the driven roller assembly to rotate according to a rotation of the driving roller assembly. In a forward rotation of the driving roller assembly, the friction roller rotates in a state interposed between the driving rollers and the driven rollers to transmit a driving force, and in a backward rotation of the driving roller assembly, floats up from the driving rollers and the driven rollers to block the driving force from being transmitted to the driven rollers.

The foregoing and/or other aspects and utilities of the present general inventive concept may also be achieved by providing an image forming device including a medium supplying unit, an image forming unit to form a toner image on a printing medium supplied from the medium supplying unit, a fixing unit to fix the toner image on the printing medium, and a medium discharging apparatus as described above to discharge the printing medium on which the toner image is fixed.

The foregoing and/or other aspects and utilities of the present general inventive concept may also be achieved by providing a power transmission apparatus including a driving roller, a driven roller spaced apart from the driving roller, and a friction roller having a center disposed above a line connecting centers of the driving roller and the driven roller to transmit a driving force from the driving roller to the driven roller when the driving roller rotates in a predetermined direction only.

The foregoing and/or other aspects and utilities of the present general inventive concept may also be achieved by providing an image forming device including a medium supplying unit, an image forming unit to form a toner image on a printing medium supplied from the medium supplying unit, a fixing unit to fix the toner image on the printing medium, and a medium discharging apparatus to discharge the printing medium on which the toner image is fixed, the medium discharging apparatus including a medium discharging frame, a driving roller assembly rotatably disposed at the discharging frame, and having a driving axis, and a plurality of driving rollers disposed on the driving axis, a driven roller assembly rotatably disposed at the discharging frame to be spaced apart from the driving roller assembly, and having a driven axis, and a plurality of driven rollers disposed on the driven axis, and a friction roller having a center disposed above a line connecting centers of the driving roller assembly and the driven roller assembly to transmit a driving force from the driving roller assembly to the driven roller assembly when the driving rollers are rotated in a predetermined direction.

The foregoing and/or other aspects and utilities of the present general inventive concept may also be achieved by providing a power transmission method including transmitting a driving force from a first roller to a second roller when the first roller is rotated in a first direction by transferring the driving force through a friction member, and removing the driving force from being transmitted from the first roller to the second roller when the first roller is rotated in a second direction by shifting the friction member away from the second roller via rotation of the first roller in the second direction.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

Throughout the drawings, the same drawing reference numerals will be understood to refer to the same elements, features, and structures.

DETAILED DESCRIPTION OF THE PREFERRED EMBODIMENTS

Figure 1:
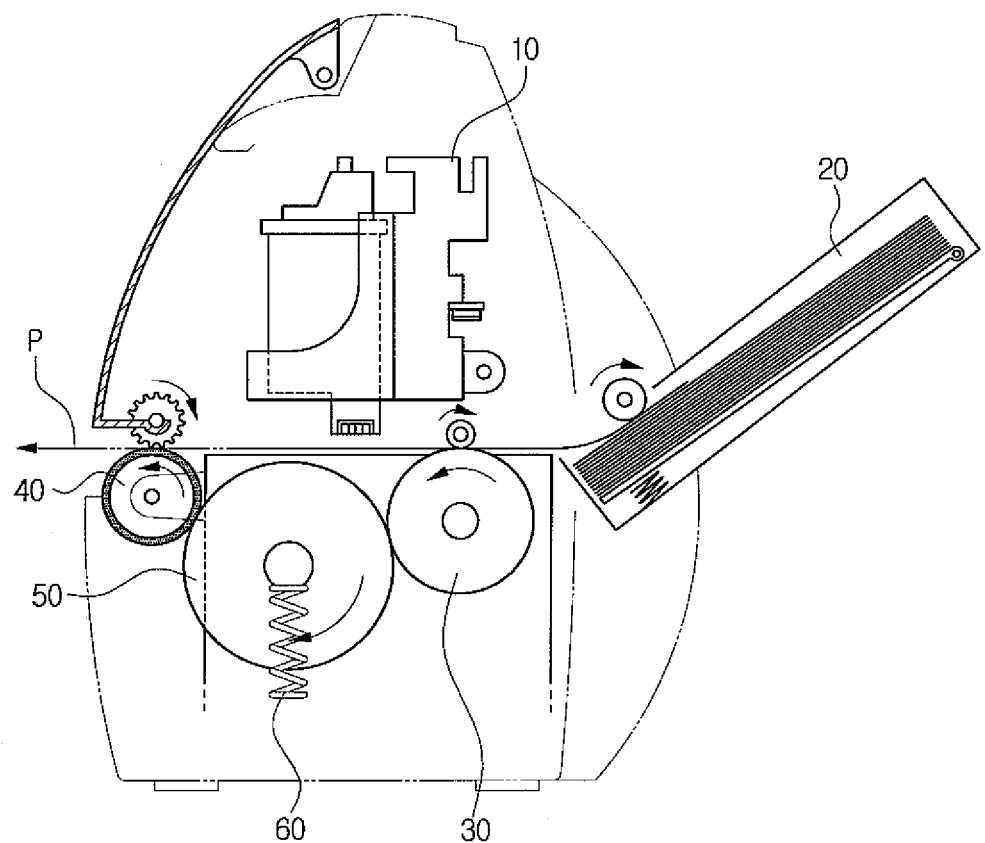
FIG. 1 is a view schematically illustrating an example of an image forming device in which a power transmission using a general friction roller is employed.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
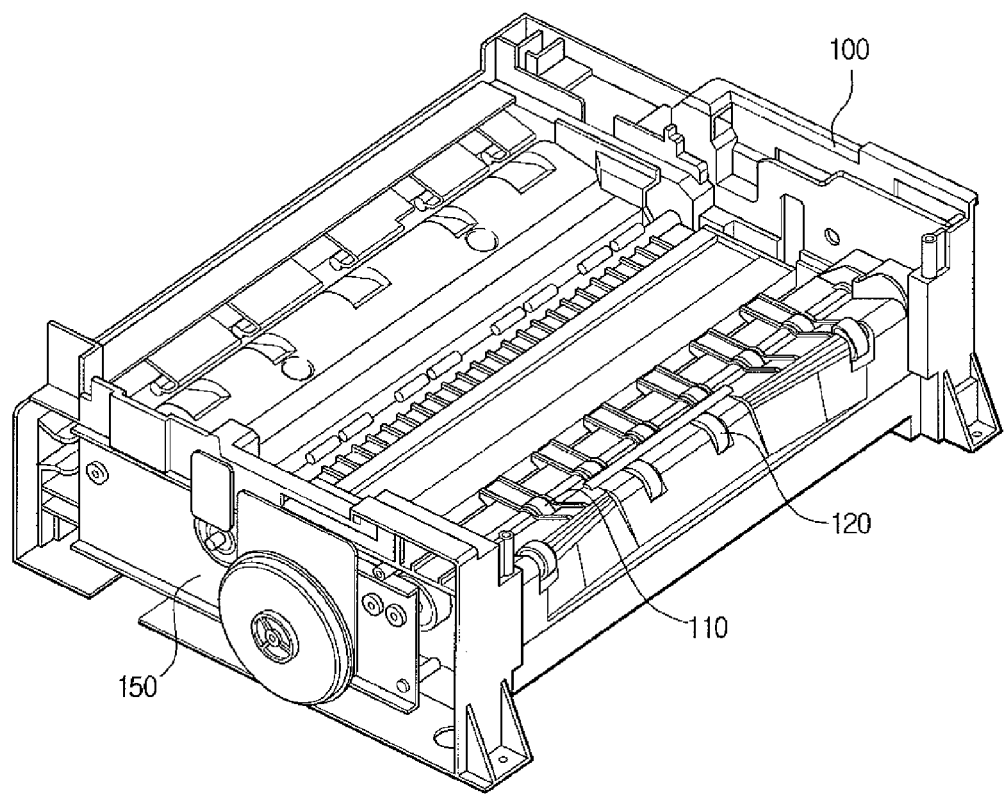
FIG. 2 is a perspective view illustrating a medium discharging apparatus of an image forming device in which a power transmission using according to an exemplary embodiment of the present general inventive concept is employed.
Figure 3:
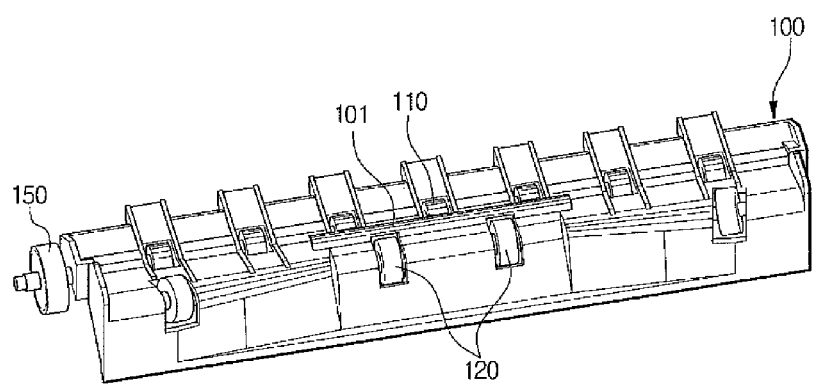
FIG. 3 is a perspective view illustrating a main portion of the medium discharging apparatus of FIG. 2.

FIG. 2 is a perspective view illustrating a medium discharging apparatus of an image forming device in which a power transmission is used according to an exemplary embodiment of the present general inventive concept is employed, and FIG. 3 is a perspective view illustrating a main portion of the medium discharging apparatus of FIG. 2.

In FIGS. 2 and 3, a reference numeral 100 represents a medium discharging frame. A driving roller assembly 110 and a driven roller assembly 120 are rotatably disposed in a spaced-apart relation to each other in the medium discharging frame 100. At one side of the medium discharging frame 100 is installed a gear train 150, which transmits a driving force to the driving roller assembly 110.

Figure 4:
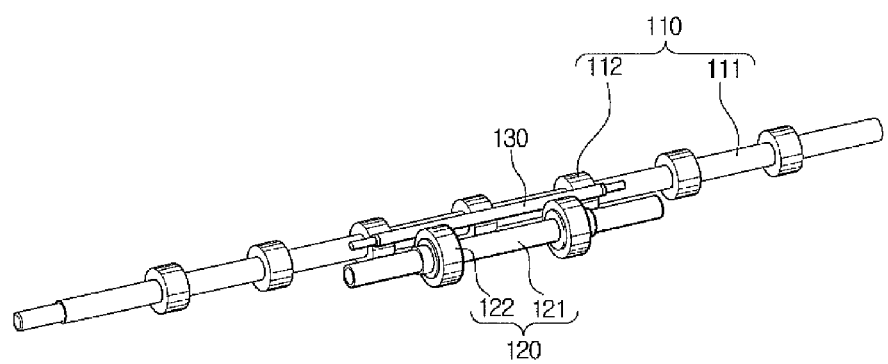
FIG. 4 is a perspective view illustrating the main portion of the medium discharging apparatus of FIG. 3 from which a medium discharging frame is removed.
Figure 5:
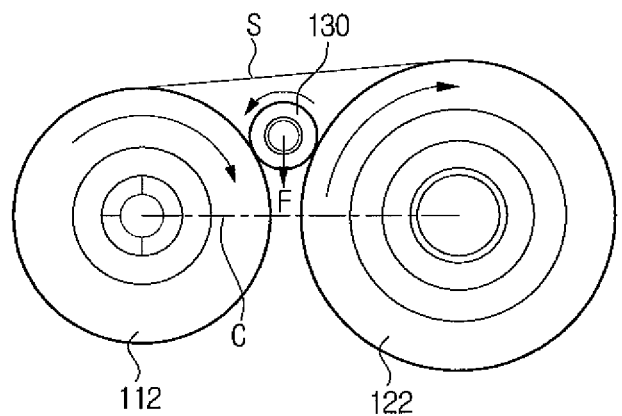
FIG. 5 is an enlarged side elevation view illustrating the main portion of the medium discharging apparatus of FIG. 4.

As illustrated in FIGS. 4 and 5, the driving roller assembly 110 includes a driving axis 111, and a plurality of driving rollers 112 disposed on the driving axis 111. Also, the driven roller assembly 120 includes a driven axis 121, and a plurality of driven rollers 122 disposed on the driven axis 121.

A friction roller 130 is placed on the driving rollers 112 and the driven rollers 122 above a line 'C' extending between centers thereof and thus coming in contact with the driving rollers 112 and the driven rollers 122. A rotating force of the driving rollers 112 is transmitted to the driven rollers 122 by the friction roller 130. The friction roller 130 transmits a rotating force when in a state of being interposed in a wedge shape between the driving rollers 112 and the driven rollers 122 by rotation of the driving rollers 112.

That is, as illustrated in FIG. 5, when the driving rollers 112 are rotated in a clockwise direction, the friction roller 130 is rotated in a counterclockwise direction and thus the driven rollers 122 are rotated in the clockwise direction. The driven rollers 122 act to push the friction roller 130 while rotating in the clockwise direction, and as a result, the friction roller 130 is subjected to a force 'F' in a downward direction and thus interposed between the driving rollers 112 and the driven rollers 122. Accordingly, the rotating force can be transmitted without using a separate pressing spring as in the conventional power transmission. Also, since an external force (e.g., such as that from a separate pressing spring) is not applied to the friction roller 130, the rotating force can be transmitted without loss.

In addition, the friction roller 130 may have a diameter of a magnitude which causes it not to project over a tangent line 'S' connecting circumferential surfaces of the driving rollers 112 and the driven rollers 122. That is, if the friction roller 130 has a magnitude so large that it will project over the tangent line S, the friction roller 130 becomes an obstacle to a conveyance of a printing medium P by the driving rollers 112 and the driven rollers 122. In addition, the friction roller 130 may have a diameter which is larger than a distance which is equal to a smallest distance between the circumferential surfaces of the driving rollers 112 and the driven rollers 122 along the line 'C' connecting the centers of the driving rollers 112 and the driven rollers 122. The friction roller 130 diameter may also be smaller than a diameter of either of the driving rollers 112 and/or the driven rollers 122, and may also be small enough to allow the printing medium P to pass by without interference and not to project over the tangent line 'S' connecting the circumferential surfaces of the driving rollers 112 and the driven rollers 122.

The friction roller 130 as described above is not limited in its constituent material. For instance, the friction roller 130 can employ a metal shaft or a rubber roller. However, in a case that the friction roller is formed of the metal shaft, it can have an uneven part formed at an outer circumferential surface thereof to increase a friction force.

Referring to FIGS. 3 and 5 the friction roller 130 is installed to the medium discharging frame 100, so that an axial movement thereof is limited. An accommodating groove 101, which accommodates the friction roller 130, is formed in the discharging frame 100. In addition, the friction roller 130 moves in directions of arrows 'F' and 'F1' illustrated in FIGS. 5 and 6, respectively, in a state placed on the driving rollers 112 and the driven rollers 122 according to rotation directions of the driving rollers 112, so that the friction roller 130 transmits or does not transmit the rotating force of the driving rollers 112 to the driven rollers 122.

Figure 6:
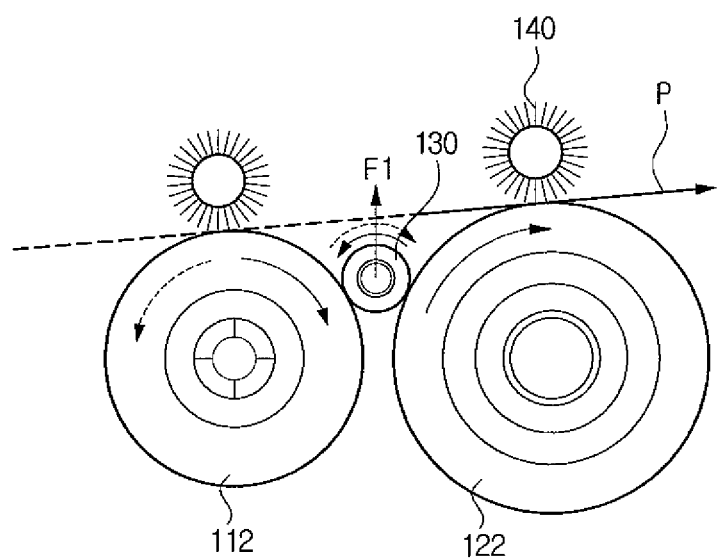
FIG. 6 is a view illustrating an operation of the medium discharging apparatus according to the exemplary embodiment of the present general inventive concept.

To be more specific, in FIG. 6, the driving rollers 112 and the driven rollers 122 are rotated in a direction of an arrow of a solid line to convey the printing medium P to a right of the drawing. Meanwhile, to admit a printing medium P having an image formed on one surface thereof in a duplex printing mode a second time to an image forming unit, the driving rollers 112 are rotated in a reverse direction.

That is, in FIG. 6, the moment the printing medium P escapes a nip between the driving rollers 112 and one of star-wheels 140, the driving rollers 112 are rotated in the reverse direction. According to this, the driving rollers 112 and the friction roller 130 are rotated in a direction of an arrow of a dotted line (counterclockwise direction). When the driving rollers 112 are rotated in the counterclockwise direction as illustrated, the friction roller 130 is subjected to a force 'F1' in an upward direction. As a result, the friction roller 130 ascends, so that it loses a contact force with the driven roller 122 and thus does not transmit the rotating force to the driven roller 122. Accordingly, since the printing medium P, which is engaged between the driven roller 122 and one of the star-wheels 140, is not attracted in a driving roller (112) direction, the printing medium can be conveyed in succession. Thus, a printing speed of the image forming device can be improved.

Figure 7:
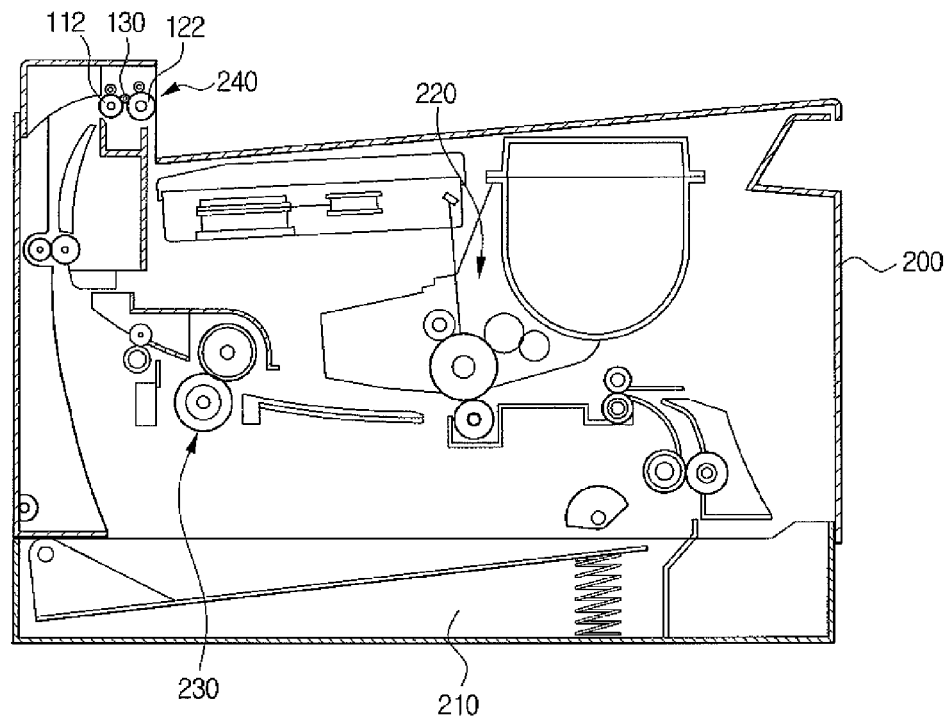
FIG. 7 is a schematic view illustrating an image forming apparatus in which the medium discharging apparatus according to the exemplary embodiment of the present general inventive concept is employed.

FIG. 7 is a schematic view illustrating an image forming apparatus in which the medium discharging apparatus according to the exemplary embodiment described above is employed. As illustrated in FIG. 7, below a main body 200 of the image forming apparatus is disposed a medium supplying unit 210, which stores printing media and supplies them one by one in a predetermined direction. The printing medium supplied by the medium supplying unit 210 passes through a developing unit 220, which transfers a desired image thereon. Subsequently, the printing medium passes through a fixing unit 230 to fix the image thereon, and then is discharged through a medium discharging apparatus 240.

The image forming operation as described above is the same as that of the conventional image forming device. However, since the medium discharging apparatus 240 is configured to be driven by the power transmission or the power transmission method of using the friction roller 130 as described above, the image forming device having the medium discharging apparatus according to the exemplary embodiments of the present general inventive concept can discharge the printing medium without generating noise. In addition, since the friction roller 130 is located over the driving rollers 112 and the driven rollers 122, the image forming device having the medium discharging apparatus according to the exemplary embodiments of the present general inventive concept can transmit a driving force to the driven rollers without using a separate pressing spring as required with the conventional image forming device. Also, since the pressing spring is not used, a construction can be simplified, and thus fabrication costs can be reduced.

As apparent from the foregoing description, according to the exemplary embodiments of the present general inventive concept, the power transmission, the medium discharging apparatus and the image forming device are configured, so that the friction roller 130 is placed on the driving rollers 112 and the driven rollers 122 to transmit the driving force in a state interposed in a wedge shape between the driving rollers 112 and the driven rollers 122. Accordingly, the power transmission, the medium discharging apparatus and the image forming device according to the exemplary embodiments of the present general inventive concept can certainly transmit the driving force without using a separate pressing spring as in the conventional image forming device. Also, since an artificial spring force is not applied to the friction roller 130, the power transmission, the medium discharging apparatus and the image forming device according to the exemplary embodiments of the present general inventive concept can transmit the driving force of the driving rollers 112 to the driven rollers 122 without power loss.

Further, the power transmission, the medium discharging apparatus and the image forming device according to the exemplary embodiments of the present general inventive concept are configured, so that the driving force of the driving rollers 112 is transmitted or not transmitted to a driven rollers 122 according to the rotation direction thereof. Accordingly, in a duplex printing mode, the driving rollers 112 can be rotated in a reverse direction, for example, to inversely convey a duplex printing medium while a preceding printing medium is discharged. As a result, the printing medium can be continuously conveyed, thereby allowing printing speed to improve.

Also, the power transmission, the medium discharging apparatus and the image forming device according to the exemplary embodiments of the present general inventive concept can not only reduce a diameter or magnitude of the friction roller 130, but also does not use the pressing spring. Accordingly, the power transmission, the medium discharging apparatus and the image forming device according to the exemplary embodiments of the present general inventive concept can maximize space utilization and reduce fabrication costs.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power transmission comprising:
a driving roller rotatable in forward and backward directions;
a driven roller spaced apart from the driving roller; and
a friction roller placed on the driving roller and the driven roller to rotate according to a rotation of the driving roller,
wherein in a forward rotation of the driving roller, the friction roller rotates in a state of being interposed between the driving roller and the driven roller to transmit a driving force, and in a backward rotation of the driving roller rises up from the driving roller and the driven roller to block the driving force from being transmitted to the driven roller.

2. The power transmission of claim 1, the friction roller is disposed above a line connecting between centers of the driving roller and the driven roller.

3. The power transmission of claim 2, wherein the friction roller has a diameter of magnitude, which does not project beyond a tangent line connecting circumferential surfaces of the driving roller and the driven roller.

4. The power transmission of claim 1, wherein the friction roller comprises a metal shaft.

5. The power transmission of claim 4, wherein the metal shaft has an uneven part formed on an outer circumferential surface thereof.

6. The power transmission of claim 1, wherein the friction roller comprises a rubber roller.

7. A medium discharging apparatus of an image forming device comprising:
a medium discharging frame;
a driving roller assembly rotatably disposed to the discharging frame, and having a driving axis, and a plurality of driving rollers disposed on the driving axis;
a driven roller assembly rotatably disposed to the discharging frame to be spaced apart from the driving roller assembly, and having a driven axis, and a plurality of driven rollers disposed on the driven axis; and
a friction roller disposed above a line connecting between centers of the driving roller assembly and the driven roller assembly to transmit a driving force from the driving roller assembly to the driven roller assembly.

8. The apparatus of claim 7, wherein the medium discharging frame has an accommodating groove formed to accommodate the friction roller.

9. The apparatus of claim 7, wherein the friction roller transmits the driving force in a state of being interposed between the driving roller and the driven roller by rotations thereof.

10. The apparatus of claim 7, wherein the friction roller comprises a metal shaft.

11. The apparatus of claim 10, wherein the metal shaft has an uneven part formed on an outer circumferential surface thereof.

12. The apparatus of claim 7, wherein the friction roller comprises a rubber roller.

13. The apparatus of claim 7, further comprising:
a plurality of star wheels to assist the driving roller and the driven roller to convey a printing medium.

14. A medium discharging apparatus of an image forming device comprising:
a medium discharging frame;
a driving roller assembly disposed to the discharging frame to be rotatable in forward and backward directions, and having a driving axis, and a plurality of driving rollers disposed on the driving axis;
a driven roller assembly rotatably disposed to the discharging frame to be spaced apart from the driving roller assembly, and having a driven axis, and a plurality of driven rollers disposed on the driven axis; and
a friction roller placed on the driving roller assembly and the driven roller assembly to rotate according to a rotation of the driving roller assembly,
wherein in a forward rotation of the driving roller assembly, the friction roller rotates in a state of being interposed between the driving rollers and the driven rollers to transmit a driving force, and in a backward rotation of the driving roller assembly rises up from the driving rollers and the driven rollers to block the driving force from being transmitted to the driven rollers.

15. The apparatus of claim 14, wherein the medium discharging frame has an accommodating groove formed to accommodate the friction roller.

16. The apparatus of claim 14, wherein the friction roller is disposed above a line connecting between centers of the driving roller assembly and the driven roller assembly.

17. The apparatus of claim 14, wherein the friction roller comprises a metal shaft.

18. The apparatus of claim 17, wherein the metal shaft has an uneven part formed an outer circumferential surface thereof.

19. The apparatus of claim 14, wherein the friction roller comprises a rubber roller.

20. The apparatus of claim 14, further comprising:
a plurality of star wheels to assist the driving roller and the driven roller to convey a printing medium.

21. An image forming device comprising:
a medium supplying unit;
an image forming unit to form a toner image on a printing medium supplied from the medium supplying unit;
a fixing unit to fix the toner image on the printing medium; and
a medium discharging apparatus to discharge the printing medium on which the toner image is fixed, the medium discharging apparatus comprising:
a medium discharging frame,
a driving roller assembly rotatably disposed at the discharging frame, and having a driving axis, and a plurality of driving rollers disposed on the driving axis,
a driven roller assembly rotatably disposed to the discharging frame to be spaced apart from the driving roller assembly, and having a driven axis, and a plurality of driven rollers disposed on the driven axis, and
a friction roller disposed above a line connecting centers of the driving roller assembly and the driven roller assembly to transmit a driving force from the driving roller assembly to the driven roller assembly.

22. The device of claim 21, wherein the friction roller transmits the driving force in a state of being interposed between the driving rollers and the driven rollers by rotation thereof.

23. An image forming device comprising:
a medium supplying unit;

an image forming unit to form a toner image on a printing medium supplied from the medium supplying unit;

a fixing unit to fix the toner image on the printing medium; and a medium discharging apparatus to discharge the printing medium on which the toner image is fixed, the medium discharging apparatus comprising:

a medium discharging frame, a driving roller assembly disposed to the discharging frame to be rotatable in forward and backward directions, and having a driving axis, and a plurality of driving rollers disposed on the driving axis, a driven roller assembly rotatably disposed to the discharging frame to be spaced apart from the driving roller assembly, and having a driven axis, and a plurality of driven rollers disposed on the driven axis, and a friction roller placed on the driving roller assembly and the driven roller assembly to rotate according to a rotation of the driving roller assembly, wherein in a forward rotation of the driving roller assembly, the friction roller rotates in a state of being interposed between the driving rollers and the driven rollers to transmit a driving force, and in a backward rotation of the driving roller assembly floats up from the driving rollers and the driven rollers to block the driving force from being transmitted to the driven rollers.

24. The apparatus of claim 23, wherein the friction roller is disposed above a line connecting centers of the driving roller assembly and the driven roller assembly.

25. A power transmission apparatus, comprising:
a driving roller;
a driven roller spaced apart from the driving roller; and
a friction roller having a center disposed above a line connecting centers of the driving roller and the driven roller to transmit a driving force from the driving roller to the driven roller when the driving roller rotates in a predetermined direction only.

26. The power transmission apparatus of claim 25, wherein the friction roller has a diameter which is larger than a distance equal to a smallest distance between circumferential surfaces of the driving roller and the driven roller along the line connecting the centers of the driving roller and the driven roller.

27. The power transmission apparatus of claim 25, wherein the friction roller has a diameter which is smaller than a diameter of the driving roller and/or the driven roller.

28. The power transmission apparatus of claim 27, wherein the friction roller has a diameter which is larger than a distance which is equal to a smallest distance between circumferential surfaces of the driving roller and the driven roller along the line connecting the centers of the driving roller and the driven roller, and which is smaller than the diameter of the driving roller and/or the driven roller.

29. The power transmission apparatus of claim 25, wherein the friction roller has a diameter which is small enough so as not to project over a tangent line connecting circumferential surfaces of the driving roller and the driven roller.

30. The power transmission apparatus of claim 25, wherein the friction roller comes out of contact with the driven roller when the driving roller rotates in a direction opposite to the predetermined direction.

31. An image forming device, comprising:
a medium supplying unit;
an image forming unit to form a toner image on a printing medium supplied from the medium supplying unit;
a fixing unit to fix the toner image on the printing medium; and
a medium discharging apparatus to discharge the printing medium on which the toner image is fixed, the medium discharging apparatus comprising:
a medium discharging frame,
a driving roller assembly rotatably disposed at the discharging frame, and having a driving axis, and a plurality of driving rollers disposed on the driving axis,
a driven roller assembly rotatably disposed at the discharging frame to be spaced apart from the driving roller assembly, and having a driven axis, and a plurality of driven rollers disposed on the driven axis, and
a friction roller having a center disposed above a line connecting centers of the driving roller assembly and the driven roller assembly to transmit a driving force from the driving roller assembly to the driven roller assembly when the driving rollers are rotated in a predetermined direction.

32. The image forming device of claim 31, wherein the friction roller has a diameter which is smaller than diameters of the driving roller assembly and/or the driven roller assembly.

33. The image forming device of claim 32, wherein the friction roller is small enough so as to allow the printing medium to pass by without interference, and has a diameter small enough such that the friction roller does not project over a tangent line connecting circumferential surfaces of the driving roller assembly and the driven roller assembly.

34. A power transmission method, comprising:
transmitting a driving force from a first roller to a second roller when the first roller is rotated in a first direction by transferring the driving force through a friction member; and
removing the driving force from being transmitted from the first roller to the second roller when the first roller is rotated in a second direction by shifting the friction member away from the second roller via rotation of the first roller in the second direction.

* * * * *